April 18, 1933.  H. R. LEWIS  1,904,740
CORN SILKER
Filed Aug. 14, 1929    6 Sheets-Sheet 2

April 18, 1933.   H. R. LEWIS   1,904,740
CORN SILKER
Filed Aug. 14, 1929   6 Sheets-Sheet 5

Inventor
Harold R. Lewis
By
Graham
Horney

Patented Apr. 18, 1933

1,904,740

UNITED STATES PATENT OFFICE

HAROLD R. LEWIS, OF HOOPESTON, ILLINOIS, ASSIGNOR TO SPRAGUE-SELLS CORPORATION, OF HOOPESTON, ILLINOIS

CORN SILKER

Application filed August 14, 1929. Serial No. 385,890.

This invention relates to an improved machine for treating green corn for canning purposes and is particularly adapted to removing silks, pieces of cob and husks as well as other débris intermixed with the cut corn as it is carried from the cutting machines to this apparatus.

To make the canning of green corn commercially possible and practical it is necessary to handle large quantities quickly and easily by automatic mechanism that will give it the proper treatments in the various stages of operation connected with the process of preparation.

The ears of green corn as brought from the field carry more or less of undesirable material adhering thereto that is usually removed by the husking operation. The husking machines remove practically all of the husks and very much of the adhering silk; some small particles, however, are not removed at this stage and accompany the ears to the cutting machines where the kernels are automatically cut from the cobs and wherein the cobs are discharged from the machine, usually in a horizontal direction while the cut kernels fall by gravity into and through a hopper which usually conveys them to other mechanism for treatment, or delivers them to conveying means that in turn delivers the cut kernels to the next operating or treating means.

This mass of cut kernels carries with it more or less of small pieces of silk, small pieces of cob and husk that escaped the husking machine and were detached when the kernels were cut from the cobs. It is necessary to treat this mass of material by some means whereby the silk, pieces of cob and husks and any other undesirable particles will be separated and removed from the kernels of cut corn. Sometimes the mixed mass of material is run over vibrating screens through which the kernels will pass but which will intercept the silks and husks and pieces of cobs and thus produce a separation. The pieces of cobs are quite easily gotten rid of because they will roll and are easily discharged from the ends of the screens. The small husks and silks, however, are not so easily handled. They soon accumulate on the screen in sufficient quantities to greatly interfere with the screening action and the cut kernels begin to follow the cob pieces over the ends of the screens. When this occurs the screens must be cleaned or replaced with clean screens without materially stopping the continuous flow of corn through the machines. Later machines have been provided with stationary wires stretched across the path of falling kernels with the idea of the silks and husks becoming entangled therewith and prevented from following the corn and thus be separated therefrom. These machines give much better results, but here the wires soon become loaded with silks and small pieces of husks and must be periodically cleaned in order to be continuously effective.

The cleaning of the wires depends on the operator manipulating some device for scraping the débris therefrom and on the frequency with which he performs the cleaning act depends more or less the efficiency of the cleaning operation. If the wires are not cleaned often enough the silks accumulate until they do not adhere firmly and begin to drop off with the passing kernels. The wires are usually placed in superposed relation in several banks or planes and are staggered relative to each other so there will be no free passage for the falling kernels, the kernels are therefore bumping from wire to wire in their passage and of course bump against the adhering silk so that when it has accumulated so that it is not firmly held the kernels knock off more or less of it and thus degrade the corn that finally goes into the can. The dependence on an operator to clean the wires frequently enough to keep the corn clean is in no wise a reliable procedure. So long as there is a human element connected with an operation of this kind just so long will there be other than uniformly accurate and desired results.

The apparatus disclosed in this application has been developed to overcome the defects of operation enumerated as well as to generally improve and better the cleaning of the cut corn preparatory to canning and comprises means and mechanism for accomplishing these results that are entirely automatic in their operation and therefore thoroughly reliable and highly efficient.

Describing my improved corn cleaning machine briefly, it comprises a feed hopper where the mass of cut corn and accompanying débris is dumped promiscuously and fed into a revolving screen member where the larger pieces of cob and husks work their way through the discharge end and are thus quickly separated. The cut kernels of corn pass through the screen openings and drop onto a traveling silking device comprising a large number of horizontally disposed wires closely arranged side by side and mounted on a traveling conveyor that is driven and guided in a manner to cause the series of wires to traverse a path leading over four superposed planes, the wires in each plane traveling in the opposite direction from those on either side so that there is a constant crossing of the wires in vertical planes. The cut kernels leaving the rotary screen drop by gravity onto the top run of moving wires, pass therethrough and contact with the wires in the next and lower run and from there pass to the wires in the next lower run and from there through the wires of the last or lowest run so that they have been intercepted in their drop by four sets of wires moving at approximately right angles to the path of the falling corn, which has caused each kernel to bump against the wires in its passage as well as all other material mixed with the corn such as small pieces of silk and husk. The silk and husk being of a stringy nature wrap around the wires and are trapped against following the corn and gradually accumulate on the wires and are carried laterally away from the path of the dropping corn.

At the end of the last run of wires there is placed a revolving cleaning brush that runs continuously in contact with the wire conveyor and acts to clean all adhering silks and husks therefrom, so that the several runs of the wire conveyor are kept in a constant state of cleanliness so that at no time will there be an over accumulation of silks and husks adhering to the individual wires of the conveyor.

To give added screening action the cut kernels after passing the moving wires are intercepted by vibratory screening members which will catch any silks or husks that escaped the moving wires and give a practically complete separation of the cut kernels and the silks and husks so that the corn passing then into the discharge hopper is substantially free of all débris and undesirable matter and is ready to receive the next treatment in the process of preparation.

These last mentioned screening members are mounted to give a shaking as well as a screening action which will be fully described.

It is therefore an object of the invention to provide a preliminary screening operation to remove from the mass of material all large objects of undesirable material.

It is also an object of the invention to provide a silking and cleaning operation wherein moving means are made to intercept the kernels of falling corn and entrap the accompanying silks and husks.

It is also an object of the invention to provide automatically operated means for continuously and constantly removing the entrapped silks and husks from the moving wires constituting the means for entrapping the silks and husks.

It is also an object of the invention to provide final screening and cleaning means for removing the last vestige of silks and husks from the mass of corn.

It is also an object to provide a unitary apparatus for carrying the aforesaid means and mechanism and power means for driving and moving the various operative parts in proper synchronism to produce the results enumerated.

With such objects in view as well as other advantages which may be inherent in the invention, consisting in the parts and combinations hereinafter set forth and claimed, it is understood that the several necessary elements, parts and combinations constituting the same may be varied in their proportions, placement and general arrangement without departing from the scope and nature of the invention, and in order to make the invention more clearly understood there is shown, in the accompanying drawings a preferred embodiment of the invention in concrete form, without limiting the improvements in their application to the particular construction chosen to illustrate the invention.

Reference may now be had to the accompanying drawings where a better understanding of the invention will be had.

The numeral 1 represents a cast frame work for sustaining the entire apparatus and driving mechanism and thus converting it into a complete unitary device.

Figure 1:
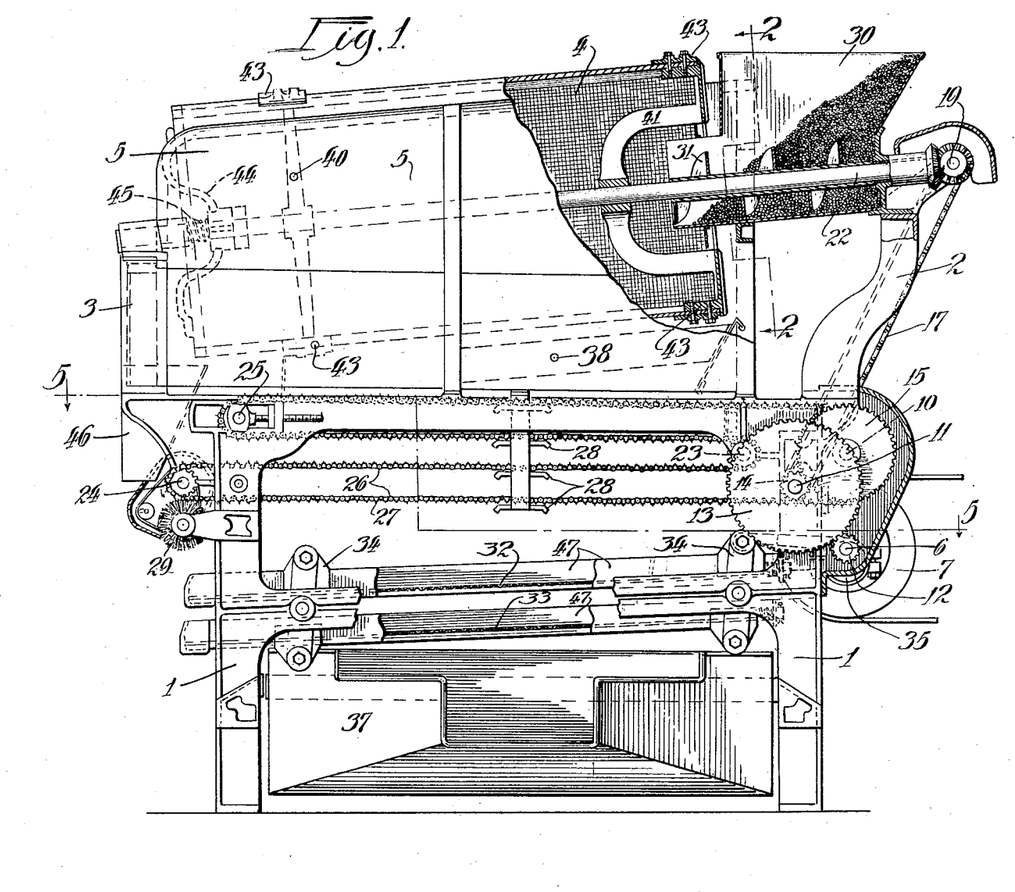
Figure 1 represents a side elevation of my improved unitary apparatus with portions broken away to show interior construction. This view clearly shows the receiving hopper; the preliminary screening element; the horizontally positioned moving wire conveyor or silking element; the final screening elements and the discharge hopper, together with more or less of the operative mechanism for moving the various parts in proper relation.
Figure 2:
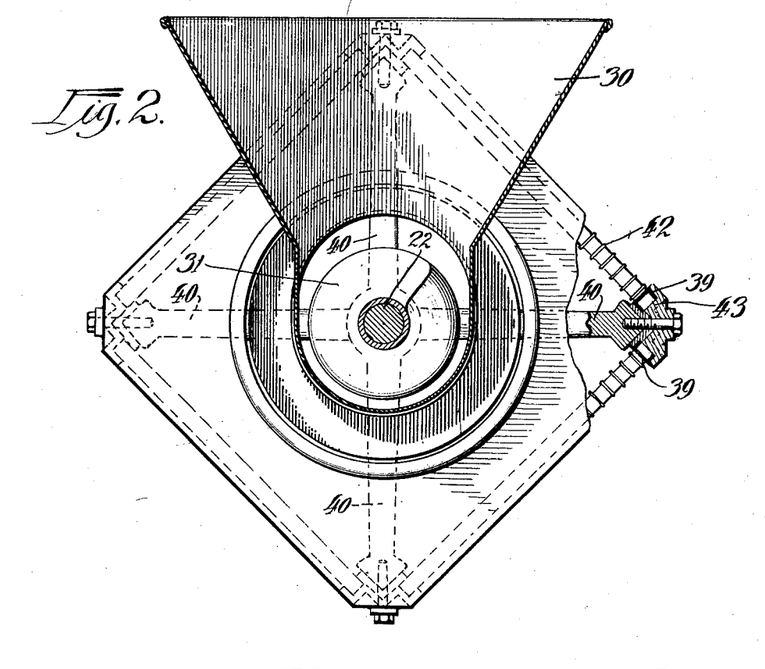
Figure 2 is a sectional elevation taken on approximately the line 2—2 of Fig. 1 and shows a portion of the receiving hopper; the feed screw and the end of the square preliminary screen member.

2 and 3 are frame extensions at either end forming supports for the receiving hopper and the preliminary screening member 4. 5 represents side shield plates to catch any material thrown out by the preliminary screen. 6 is a main drive shaft extending across the right end of the machine of Fig. 1. On this shaft is mounted a drive pulley 7 carrying a clutch 8 and an operating cone 9, the lever being omitted. Above the main shaft 6 and carried by the frame members 1 are two other shafts 10 and 11.

A pinion 12 on shaft 6 meshes with a gear 13 on shaft 11, and a pinion 14 on shaft 11 meshes with a gear 15 on shaft 10, thus forming a gear train by which the said shafts are operated in timed relation. The shaft 11 carries a sprocket 16, connecting by a chain 17 with a sprocket 18 on the shaft 19 at the extreme top right of Fig. 1.

The shaft 19 carries a bevel gear 20 meshing with a companion gear 21 on the shaft 22 forming the pivotal support for the preliminary screen member 4.

The shafts 23, 24 and 25 together with shaft 10 form the support for the moving silking device comprising a conveyor composed of the two side chains 26 carrying the cross wires 27 and running on suitable sprockets on the respective shafts. The shaft 25 is mounted in adjustable bearings so the tension of the chains may be maintained at the desired working strain. To prevent whipping of the wire conveyor central support members are provided in the parts 28. Located under the left end of the lower run of the wire conveyor silking device is a cleaning brush 29 driven from the shaft 24 by means of suitable sprockets and a chain.

A receiving hopper 30 is mounted adjacent the top right of the machine where the material to be cleaned is dumped and is taken up by a feed screw 31 and conveyed into the rotary screening member 4.

Figures 9, 10, 11:
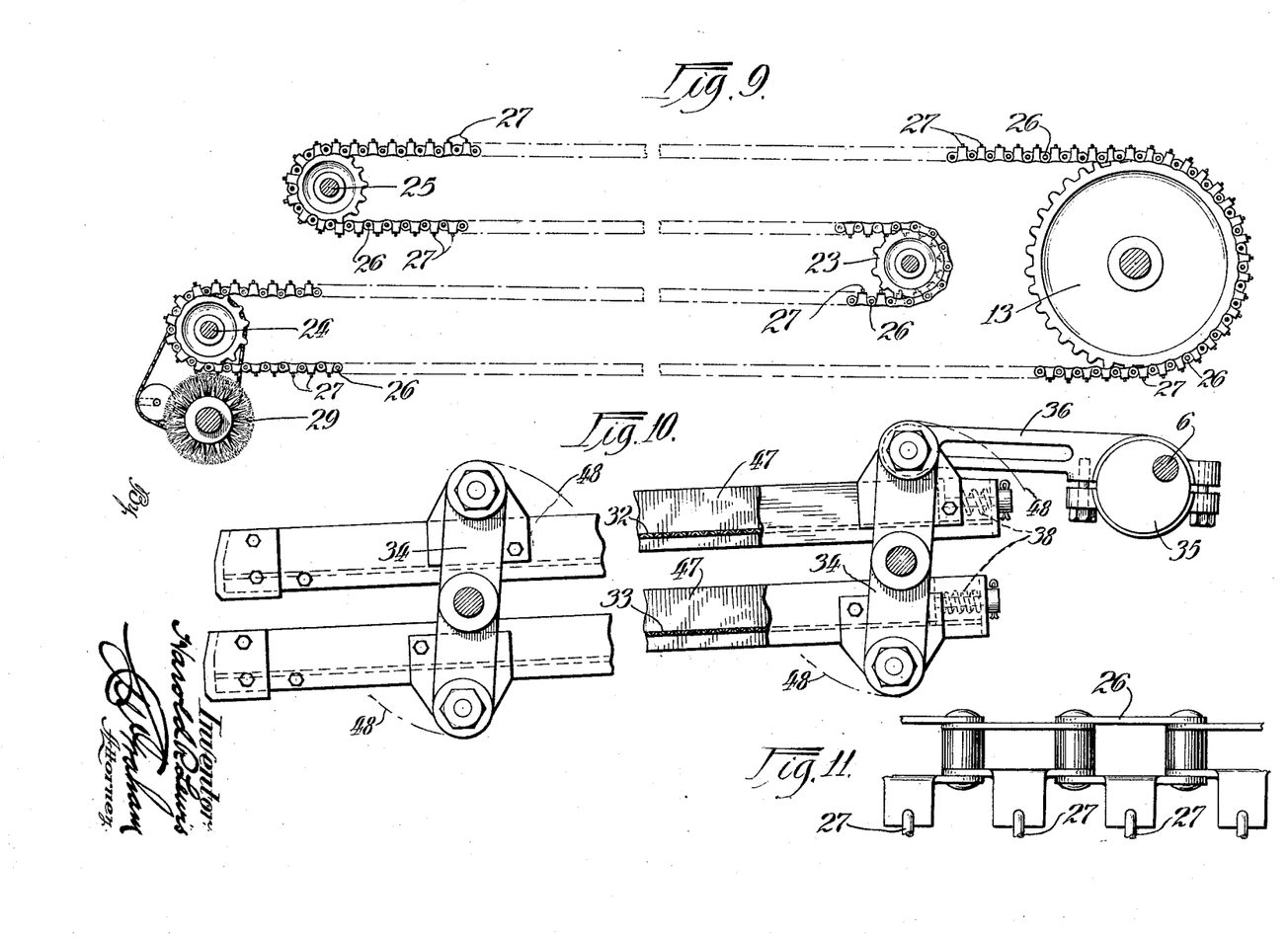
Fig. 9 is a side elevation of the silking conveyor and the cleaning brush.
Fig. 10 is a side elevation of the final screening members and plainly shows the mounting and drive means therefor.
Fig. 11 is a detail of one of the conveyor chains showing the manner of mounting the silking wires thereto.

Directly under the wire silking conveyor are mounted final screening members 32 and 33, mounted on the rocker arms 34 and given a component of vibratory and tossing movement by the eccentrics 35 on the shaft 6 and the connections 36, best seen in Fig. 10.

Directly under the finishing screens is located the discharge hopper 37 which receives the cleaned corn and delivers it to the next treating mechanism.

Figure 6:
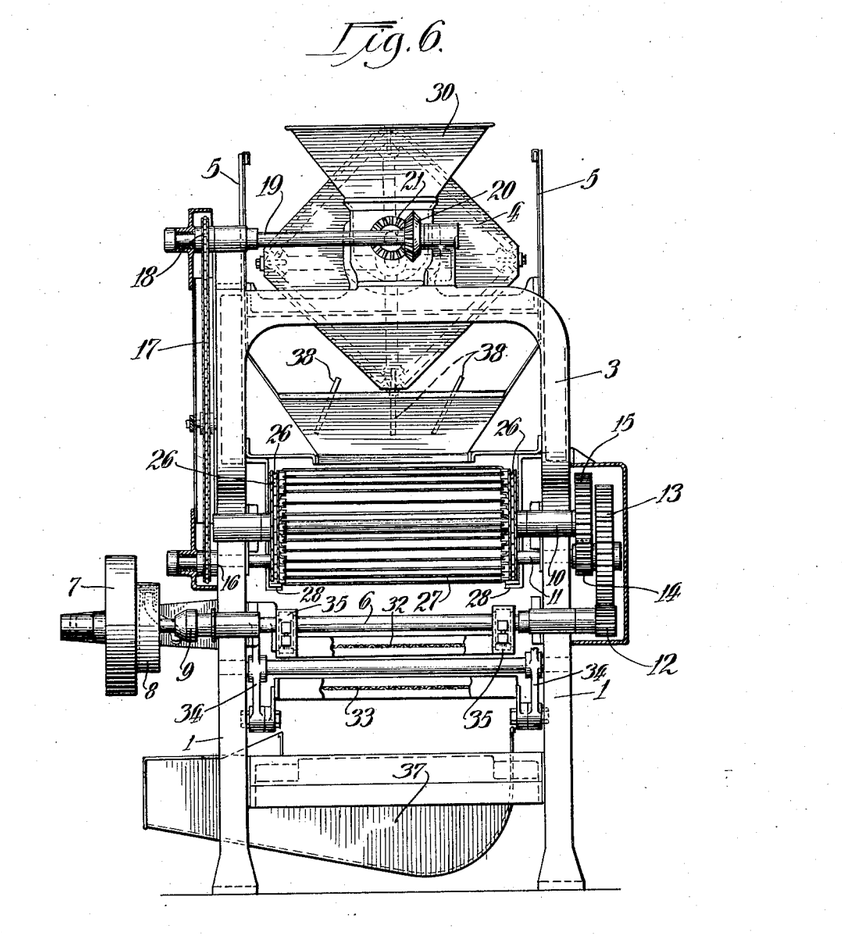
Fig. 6 is an end elevation from the right of Fig. 1 and shows the various elements in their relative locations.

In order to procure an even distribution of the corn falling from the screening member 4 onto the wire silking conveyor 27 I place deflecting plates 38 under the screen 4 as shown in Figs. 6 and 1.

Wherever a screen is used for cleaning cut corn and separating the small pieces of silk from the mass, the screen member soon becomes more or less clogged up and must be cleaned, hence it is desirable that all screen members may be easily removed.

The screens 32 and 33 are mounted in a frame and held in position by means of springs 38. In order to remove the screens 32 and 33 it is only necessary to lift the ends opposite the springs 38, push them against the springs until the free end may be lifted up and then pull them away from the frame and replace with clean ones. This operation is so simple that the change may be made without stopping the machine. Likewise the screen sections of the screen member 4 are assembled in a manner for easy removal.

Figure 3:
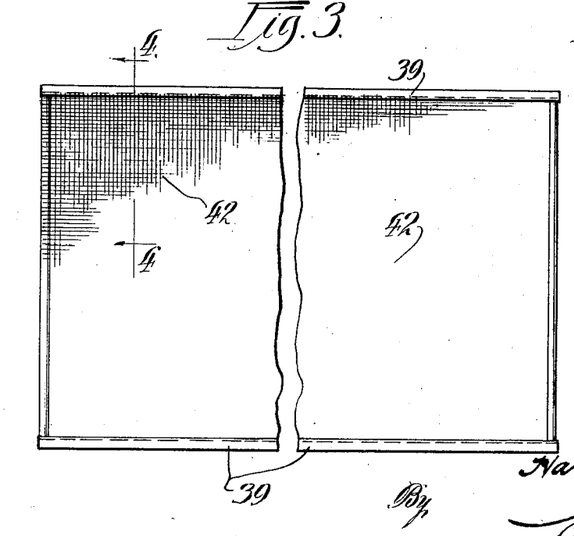
Fig. 3 is a detail of a portion of the screen member of Fig. 2 showing the rigid frame construction.
Figure 4:
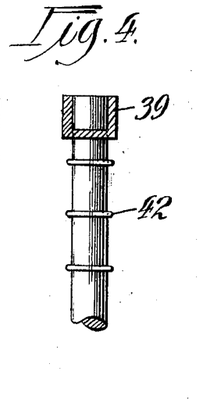
Fig. 4 is a further detail of and edge and corner of the screen member of Fig. 3 showing clearly the manner of securing the screening wire to the frame.
Figure 5:
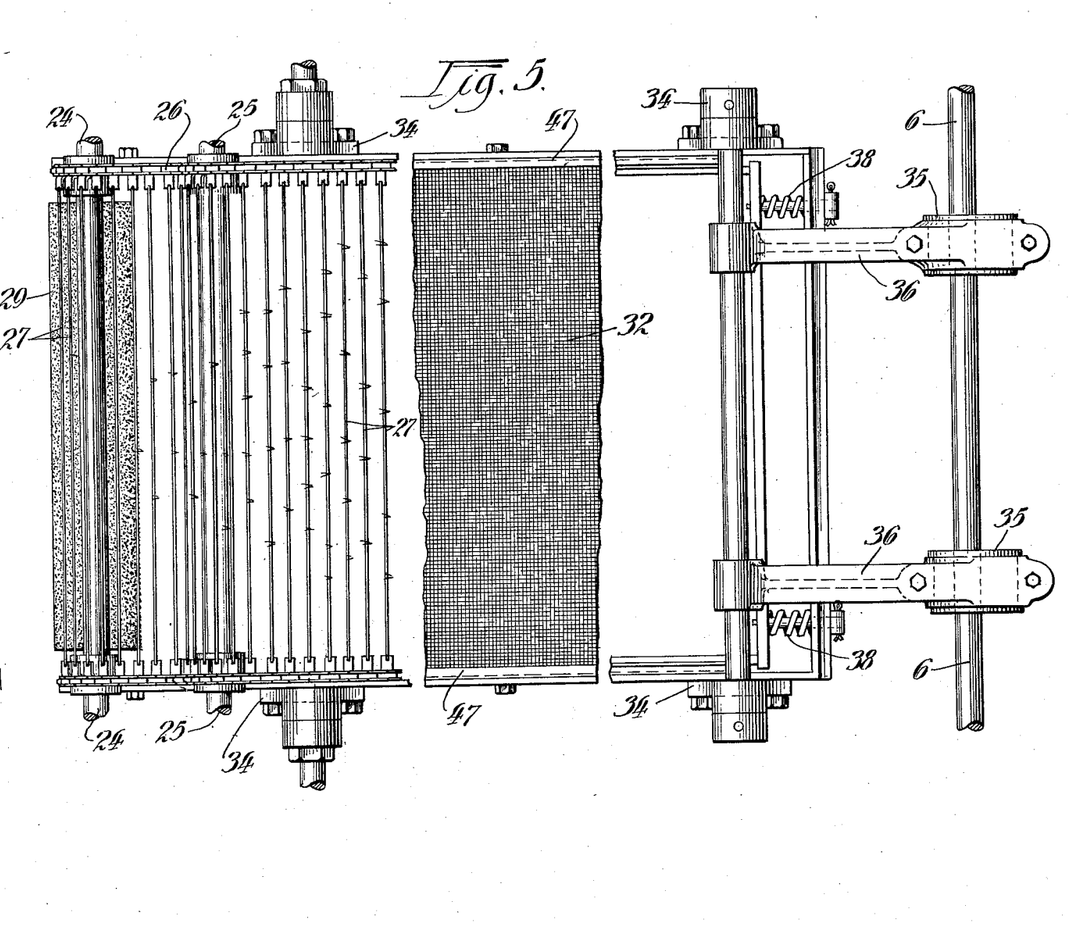
Fig. 5 is a plan taken on approximately the irregular line 5—5 of Fig. 1 and shows the top of the left end of Fig. 1, of the moving wire silking device, which is then broken away and the top of the first of the final screen elements shows, this is then broken away to shorten the view and the top of the eccentrics and shaft for operating the vibratory screen members are shown at the right end of the view.
Figure 8:
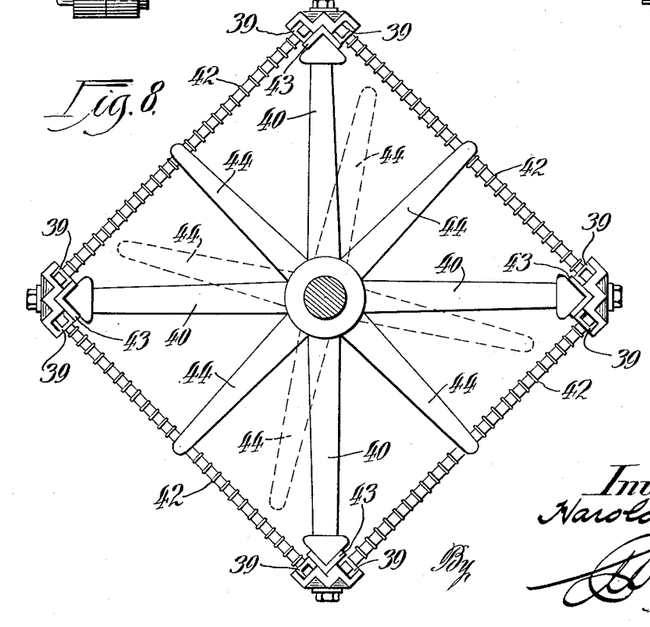
Fig. 8 is a detail of the preliminary screening member.

The screen sections are made up of frames such as is shown in Fig. 3 and 4. The opposite edges of the frame being made of channel iron section material 39 and the skeleton frame for holding these screen sections is made up of spider arms 40, seen best in Fig. 8 and in dotted lines in Fig. 1, and the head member 41 and attending parts in Fig. 1. Fig. 8 shows the screen members 42 assembled in the frame support with the channel edges resting in the grooves provided for their reception by the angle plates 43. These screen sections are held in operative position by means of a manually manipulative spider member 44 held under tension against the ends of the screen sections by the spring 45 shown in dotted lines in Fig. 1. By turning this spider 44 to the position of the dotted lines in Fig. 8 the screen sections 42 are released and may be pulled out of their bearings and clean screens put in their place. Of course the machine must be stopped temporarily when making this change, but this manner of construction makes the change very simple and quickly accomplished.

Operation

The operation of the machine would be substantially as follows when constructed according to the showing of the accompanying drawings but may vary somewhat if a different arrangement of the inventive concept were employed.

The mass of cut corn and accompanying pieces of cob, husks and silk are dumped into the hopper 30 where the screw 31 moves it gradually into the screening member 4 which is constantly rotating, and being mounted on an inclined axis the mass of material will gradually work toward the lower end of the screen member. The cobs and husks that cannot pass through the screen meshes will work along the screen and be discharged at the lower end down the chute 46 into any suitable receptacle or onto a conveyor, neither of which are shown. The corn, smaller pieces of husks and some of the pieces of silk will fall through the meshes of the screen sections 42 and some of the husks and silk will be caught by the screen sections 42, so that the screen member 4 acts as a preliminary cleaning agent and removes some silk, all the larger cobs and husks and permits a partially cleaned product to fall onto the next cleaning element, the moving wire conveyor 27. As will be understood from the previous description this conveyor is made up of two chains riding on suitable sprockets with cross wires attached from chain to chain and spaced rather close together to form elongated slots through which the corn, silk and husks will fall. The top deck of the conveyor will catch and retain most of the silk and husks, these small pieces wrapping over the wires and suspending therefrom and being conveyed through the several runs until the cleaning brush is reached when they will be brushed from the wires. As the corn falls through the several decks of wires that are constantly moving each kernel will bump from wire to wire and the small silks adhering and accompanying the kernels will all gradually be entrapped by the wires and carried away to the cleaning brush. In fact the cleaning action of the moving conveyor is so thorough and effective that very little silk or husk is caught by the lower deck of wires, so that the product that is dropped on the final cleaning screens 32 and 33 is practically clean and these screens through their component of movement effect a final cleaning that takes out the last residue of undesirable material and deliver a thoroughly cleaned product to the discharge hopper 37.

Figure 7:
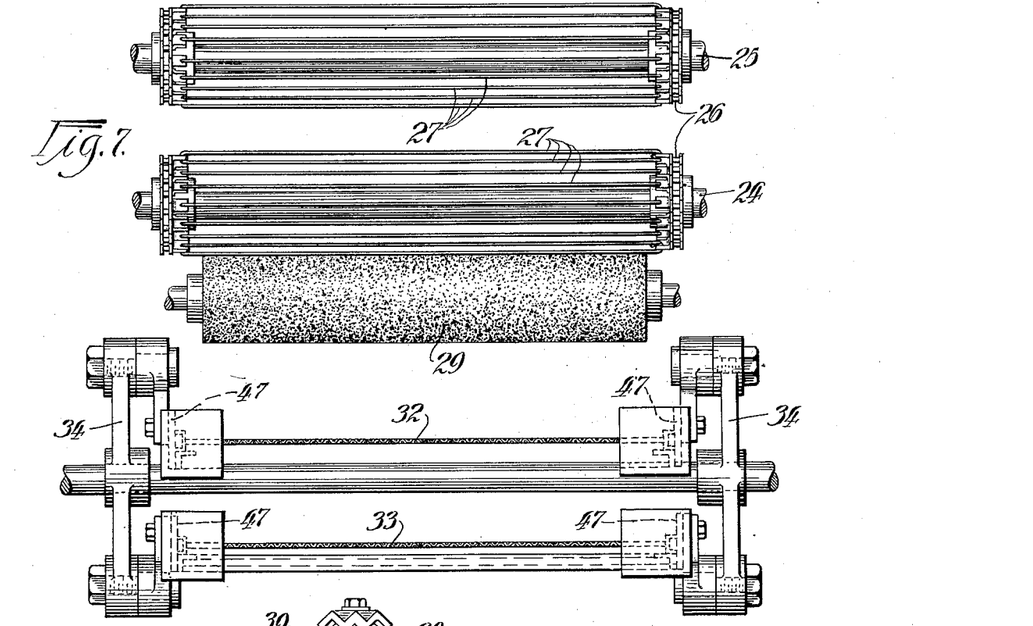
Fig. 7 is an end elevation somewhat in detail of the left end of the moving silking conveyor and the final screens of Fig. 1.

The screening members 32 and 33 are given a vibratory as well as an angular tossing movement through their mounting and driving means. The frame members 47 are supported on the rocker arms 34 and are given motion by the eccentrics 35 and rods 36. This manner of mounting gives an upward and forward movement to the frames, they moving through a path represented by the dotted arc 48, which vibrates them and gives also a kind of tossing movement, and at the same time moves them in alternate directions which gives a very thorough shaking to the mass of corn falling thereon and helps very materially to dislodge any small particles of silk or husk adhering to the kernels that were not caught by the wire conveyor. These final screens seem to remove the last particles of undesirable material and produce a really clean product. The peculiar movement given the screens 32 and 33 tosses the material about and brings it again and again into contact with the screen surfaces and jostles each kernel against its neighbor so that they are all rubbed clean before they get through the meshes of the screens. Any cobs that may have escaped the first screen member 4 and dropped through with the kernels are thrown forward at each movement of the screens 32 and 33 and are gradually thrown off the lower ends of the screens, since it will be noted that they are given an incline in their mounting, similar to the screen member 4, and that the lower ends are open as is shown in Fig. 7.

What I claim as new and desire to secure by Letters Patent is:

1. A machine for removing refuse matter from a mass of cut green corn comprising a preliminary screening means for effecting a rough separation of refuse matter from a mass of corn and discharging the corn so it will fall vertically, a second separating means comprising a series of parallel arranged rods, means for supporting and moving said rods in permanently spaced relation through a plurality of superposed paths wherein the rods move in reverse direction in traversing each path, the rods thereby continually intercepting the falling corn and collecting the residue of débris falling with the corn and moving it laterally away from the path of the falling corn with means along the path of said moving rods for removing the collected débris therefrom.

2. A machine for removing débris from a mass of cut green corn through a series of successive steps comprising a three stage operation, the first stage consisting of a preliminary screening means for effecting a rough separation of the débris from a mass of cut green corn and discharging the corn so it will fall vertically, a second stage consisting of a series of parallel arranged rods with means for supporting and moving said rods through a plurality of superposed intercepting paths with said rods in permanently spaced relation, said rods passing through said falling corn whereby the residue of débris falling with said corn will be collected by said moving rods and carried away laterally from the path of falling corn with means along the path of the moving rods to remove the accumulated residue before the rods from the superposed paths return to the uppermost path for further duty, a third stage consisting of a vibratory screening member onto which the falling corn collects and which removes the last vestige of débris that may have fallen from the rods during the passage of the corn therethrough.

3. An apparatus for removing débris from a mass of cut green corn comprising an endless separating conveyor device consisting of a plurality of small rods arranged in parallel relation and spaced in permanent relation, with means for supporting said rods and moving them through a series of superposed paths, the rods moving in reverse direction as they traverse successive paths whereby the said rods are constantly crossing each other as they move through said superposed paths, means for dropping a mass of cut green corn and débris onto said rods which permit the corn to pass therebetween but which collect the débris falling with said corn and move it laterally away therefrom with means along the paths of the moving rods for removing the accumulated débris so that the uppermost path of the moving rods always presents a cleaned surface to the falling corn, with means for collecting the said corn after passing through the paths of the said rods.

4. An apparatus for removing the residue of silks from a mass of cut green corn comprising means for discharging a mass of corn and adhering silks continuously so they will fall over a prescribed area, means intercepting the falling material comprising an endless continuously moving device made up of a plurality of parallel arranged rods permanently arranged in spaced relation, means supporting and moving said endless device through a plurality of superposed paths said device moving in reverse direction in each adjacent path, so that the said rods will continually intercept each other in vertical planes and thereby providing a separating zone for the falling corn that causes each kernel thereof to contact with said rods in succession and have the accompanying silks collected by said rods and moved laterally away from the zone of separation, with means along the paths of the moving rods to remove the accumulated silks so that the top run of rods will always present a cleaned surface to the falling corn.

5. An apparatus for removing silks from cut green corn comprising means for discharging a mass of material so it will fall through a prescribed separating area, a plurality of parallel disposed rods arranged in permanent spaced relation, means for supporting and moving said rods through a plurality of superposed paths the said rods moving in reverse directions in adjacent paths, so that they will continually intercept each other in vertical planes and cause each kernel of corn and piece of silk to contact with one or more rods in its passage through said separating zone whereby the rods will accumulate the silks and move them laterally away from the separating zone with means along one of said paths to contact with said rods and remove the accumulated silks so that the top run of rods will always present a cleaned surface to the mass of falling material.

6. An apparatus for removing silks and other débris from cut green corn comprising an operative unit including three separate stages of operation, the first stage comprising a rotary element into which material is fed continuously, means associated with said rotary element to separate the larger particles of débris from the corn and discharge it horizontally therefrom, other means associated with said rotary element to discharge the cut corn and some of the smaller débris vertically, the second stage comprising a plurality of parallel disposed and permanently spaced rods, means for supporting and moving said rods continuously and in reverse direction as they traverse successive paths which causes said rods to continually intercept each other and cause a constantly changing maze of rods for the falling material to pass through whereby each kernel of falling corn will contact with one or more of said rods and any silks adhering thereto be collected by said rods and moved laterally away from the said zone of separation, the third stage comprising a reciprocating element adapted to receive the falling corn as it emerges from said separating zone including the moving rods and to agitate the said falling corn and residue of silks adhering thereto and discharge the corn vertically and discharge the adhering débris laterally, with a suitable receiving means for the finished product.

7. An apparatus for removing silks and other débris from a mass of cut green corn or the like comprising means for continuously distributing cut corn and débris over a prescribed area so it will fall in somewhat separated relation, a plurality of parallel and permanently spaced rods forming a separating zone, means for supporting and moving said rods through a plurality of superposed paths the rods moving in reverse direction as they traverse successive paths thereby causing said rods to continually intercept each other in vertical planes as they pass over the said paths, the oppositely moving rods forming a maze of continually changing vertical paths which cause the falling material to contact with said rods and the débris to be accumulated thereby and moved laterally away from the separating zone, means along the lower of said intercepting paths for removing the accumulated débris from said rods and means for then directing the said cleaned rods from the lower path to the upper path in substantially cleaned condition.

8. An apparatus for removing silks and other débris from cut green corn comprising a separating zone consisting of a plurality of small rods disposed in parallel relation and permanently spaced, a pair of endless chains for supporting and moving said rods through a series of superposed paths the rods moving in reverse direction as they traverse successive paths, cross shafts and sprockets thereon positioned to support said chains and direct them through said paths, the said chains being arranged so that the portion moving through the lowermost path is directed to the uppermost path, means for delivering a mass of material for separation to said rods and means below said rods for collecting the material passing therethrough, with means along the path of said rods for removing débris therefrom.

9. An apparatus for removing silks and other débris from cut green corn comprising a separating zone consisting of a plurality of permanently spaced rods, chains for supporting and moving said rods in unison, shafts and sprockets for supporting and moving said chains, said shafts being arranged to move said chains through a series of superposed paths so that said rods will continually intercept each other in vertical planes and thereby produce a continually changing maze of rods for the falling material, the said rods collecting débris from the material and moving it laterally away from the separating zone with means along one of the paths for removing the collected débris from the rods, with means below said rods for collecting the cleaned corn.

10. An apparatus for cleaning débris from cut green corn comprising a series of permanently spaced rods, chains for supporting, moving and holding said rods in spaced relation, shafts and sprockets for supporting and moving said chains, said shafts arranged to direct said chains through a plurality of superposed paths one above the other the rods moving in reverse direction as they traverse successive paths, the movement of said chains through said reverse paths causing the rods in each path to constantly intercept the rods in adjacent paths so that there is no direct vertical path for the falling material and it is caused thereby to bump from rod to rod the small silks adhering to the kernels being collected by the said rods and carried laterally away from the falling material, with means for collecting the cleaned material.

In testimony whereof I hereby affix my signature.

HAROLD R. LEWIS.